(12) United States Patent
Nishimura et al.

(10) Patent No.: US 9,403,276 B2
(45) Date of Patent: Aug. 2, 2016

(54) ROBOT SYSTEM AND METHOD FOR CONTROLLING ROBOT SYSTEM

(71) Applicant: KABUSHIKI KAISHA YASKAWA DENKI, Kitakyushu-shi (JP)

(72) Inventors: Takashi Nishimura, Kitakyushu (JP); Tamio Nakamura, Kitakyushu (JP); Dai Kouno, Kitakyushu (JP); Takashi Suyama, Kitakyushu (JP); Tomohiro Matsuo, Kitakyushu (JP); Shinichi Ishikawa, Kitakyushu (JP); Tomoki Kawano, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 0 days.

(21) Appl. No.: 14/207,654

(22) Filed: Mar. 13, 2014

(65) Prior Publication Data

US 2014/0277723 A1    Sep. 18, 2014

(30) Foreign Application Priority Data

Mar. 15, 2013    (JP) .................. 2013-052805

(51) Int. Cl.
*G05B 19/04*    (2006.01)
*G05B 19/18*    (2006.01)
(Continued)

(52) U.S. Cl.
CPC ............ *B25J 9/1676* (2013.01); *G05B 19/4061* (2013.01); *G05B 2219/40202* (2013.01); *G05B 2219/40203* (2013.01)

(58) Field of Classification Search
CPC ............ B25J 9/16; B25J 9/1676; B25J 19/06; B25J 9/1671; B25J 9/1674; B25J 9/1697; B25J 9/1692; B25J 9/1664; B25J 9/1607; B25J 9/1025; B25J 9/1666; B25J 9/1684
USPC ......... 700/250, 255, 245, 253, 254, 258, 259; 901/1; 382/153
See application file for complete search history.

(56) References Cited

U.S. PATENT DOCUMENTS 6,778,092 B2 *  8/2004  Braune ............... F16P 3/14
                                                250/221
7,761,231 B2 *  7/2010  Kawabe et al. ............ 701/493
(Continued)

FOREIGN PATENT DOCUMENTS

DE        10324627      1/2005
DE        102005011143  9/2006
(Continued)

OTHER PUBLICATIONS

MachineTranslation for Reference_JP 2010-052114.*
(Continued)

*Primary Examiner* — Jason Holloway
*Assistant Examiner* — Rachid Bendidi
(74) *Attorney, Agent, or Firm* — Mori & Ward, LLP (57) ABSTRACT

A robot system of the present disclosure includes: a robot including an operable working arm; a motion speed detection unit configured to detect a motion speed of the working arm; a region setting unit that sets a region with a predetermined range around the robot; a moving body detection unit configured to detect a position of the moving body other than the robot; and an abnormality determination unit configured to determine abnormality when detecting of the position of the moving body within the region, wherein the region setting unit changes the range of the region according to the motion speed of the working arm.

15 Claims, 8 Drawing Sheets

(51) Int. Cl.
*B25J 9/16* (2006.01)
*G05B 19/4061* (2006.01)

(56) References Cited

U.S. PATENT DOCUMENTS

| | | | |
|---|---|---|---|
| 2006/0049939 A1* | 3/2006 | Haberer | F16P 3/14 |
| | | | 340/541 |
| 2006/0173577 A1* | 8/2006 | Takeda et al. | 700/245 |
| 2007/0027579 A1* | 2/2007 | Suzuki et al. | 700/245 |
| 2008/0161970 A1* | 7/2008 | Adachi | B25J 9/0003 |
| | | | 700/253 |
| 2009/0043440 A1* | 2/2009 | Matsukawa et al. | 701/25 |
| 2009/0171505 A1* | 7/2009 | Okazaki | B25J 9/1676 |
| | | | 700/258 |
| 2011/0184558 A1* | 7/2011 | Jacob | A61B 19/2203 |
| | | | 700/259 |
| 2011/0264266 A1* | 10/2011 | Kock | B25J 9/1676 |
| | | | 700/253 |
| 2011/0270444 A1* | 11/2011 | Nagata et al. | 700/258 |
| 2012/0290132 A1 | 11/2012 | Kokubo et al. | |
| 2014/0067121 A1* | 3/2014 | Brooks | B25J 9/1676 |
| | | | 700/255 |

FOREIGN PATENT DOCUMENTS

| | | |
|---|---|---|
| EP | 2364243 | 9/2011 |
| JP | 4219870 B2 | 2/2006 |
| JP | 2010-052114 | 3/2010 |
| JP | 2010052114 A * | 3/2010 |
| JP | 2012-236244 | 12/2012 |
| WO | WO 2010/063319 | 6/2010 |

OTHER PUBLICATIONS

Hoffman et al. Biologically-inspired dynamical systems for movement generation: automatic real-time goal adaptation and obstacle avoidance, May 2009, IEEE.*
Japanese Office Action for corresponding JP Application No. 2013-052805, Sep. 2, 2014.
Chinese Office Action for corresponding CN Application No. 201410006731.7, Jul. 29, 2015.
Extended European Search Report for corresponding EP Application No. 14157020.0-1807, Sep. 24, 2015.
Chinese Office Action for corresponding CN Application No. 201410006731.7, Apr. 5, 2016.

* cited by examiner

ROBOT SYSTEM AND METHOD FOR CONTROLLING ROBOT SYSTEM

CROSS-REFERENCE TO RELATED APPLICATION

This application claims priority from Japanese Patent Application No. 2013-052805 filed with the Japan Patent Office on Mar. 15, 2013, the entire content of which is hereby incorporated by reference.

BACKGROUND

1. Technical Field

The present disclosure relates to a robot system and a method for controlling the robot system.

2. Related Art

DESCRIPTION OF THE RELATED ART

Conventionally, a robot with an operable working arm has been suggested. In general, a safety fence is disposed around the working arm to separate an operation region for the working arm separated from an operation region for people. However, for example, a person may enter the safety fence to supply the work object. Further, in recent years, both the robot and the people have expanded opportunities to work together in a space where the operation regions for the working arm and the people are not separated. The use of the robot in such a circumstance may cause a risk that the robot and a person interfere with each other if the person enters the operation region for the working arm. A safety countermeasure has been built for avoiding such a risk. For example, a man•machine working system disclosed in Japanese Patent No. 4219870 includes a transmitter provided for a person, a receiver attached to a device to respond to the transmitter, and a position detector. The position detector detects the position of the person relative to the device by calculating an output signal from the receiver.

In the man•machine working system disclosed in Japanese Patent No. 4219870, the positional relation of the person to the device is detected by the position detector. Based on the positional relation, the operation region for people is set.

SUMMARY

A robot system of the present disclosure includes: a robot including an operable working arm; a motion speed detection unit configured to detect a motion speed of the working arm; a region setting unit that sets a region with a predetermined range around the robot; a moving body detection unit configured to detect a position of the moving body other than the robot; and an abnormality determination unit configured to determine abnormality when detecting of the position of the moving body within the region, wherein the region setting unit changes the range of the region according to the motion speed of the working arm.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A robot system of an exemplary aspect of the present disclosure includes: a robot including an operable working arm; a motion speed detection unit configured to detect a motion speed of the working arm; a region setting unit that sets a region with a predetermined range around the robot; a moving body detection unit configured to detect a position of the moving body other than the robot; and an abnormality determination unit configured to determine abnormality when detecting of the position of the moving body within the region, wherein the region setting unit changes the range of the region according to the motion speed of the working arm.

The robot may have a base that supports the working arm and a moving mechanism configured to move the base.

The moving body detection unit may detect a position and a moving speed of the moving body. The region setting unit may set the range of the region in accordance with a relative speed between the motion speed of the working arm and the moving speed of the moving body.

A process of the abnormality determination by the abnormality determination unit may include at least one control of stop of motion of the robot, issuing of alarm, and reduction of the motion speed of the working arm.

The robot may execute a plurality of works by having a motion program installed therein. The motion program may contain information that defines the motion speed of the working arm.

The motion program may contain information that defines the motion speed of the working arm. The abnormality determination unit may perform different abnormality determination in accordance with the work of the robot in execution when detecting of the position of the moving body within the region.

The motion speed detection unit may detect at least one component of an X-direction component, a Y-direction component, and a Z-direction component on an XYZ coordinate system of the motion speed of the working arm. The region setting unit may set the range of the region in accordance with at least one component among the X-direction component, the Y-direction component, and the Z-direction component of the motion speed detected by the motion speed detection unit.

The moving body detection unit may be a laser ranging device, a photographing device, or a data receiving device. The data receiving device is configured to read data from an IC tag provided for the moving body.

The region setting unit may set a plurality of different regions around the robot. The abnormality determination unit may perform different abnormality determination for each of the regions.

The abnormality determination unit may cancel the abnormality determination when detecting that the position of the moving body is not within the region after the abnormality determination.

A method for controlling a robot system of another exemplary aspect of the present disclosure includes: detecting a motion speed of an operable working arm of a robot; setting a region with a predetermined range around the robot; detecting a position of a moving body other than the robot; and determining abnormality when detecting of the position of the moving body within the region, wherein the setting of the region includes changing the range of the region according to the motion speed of the working arm.

Other objects and characteristics of the present disclosure will be made apparent from the embodiments to be described below with reference to the attached drawings.

The robot system and the method for controlling the robot system according to the present disclosure can achieve the high safety and the high working efficiency.

[First Embodiment]

Figure 1:
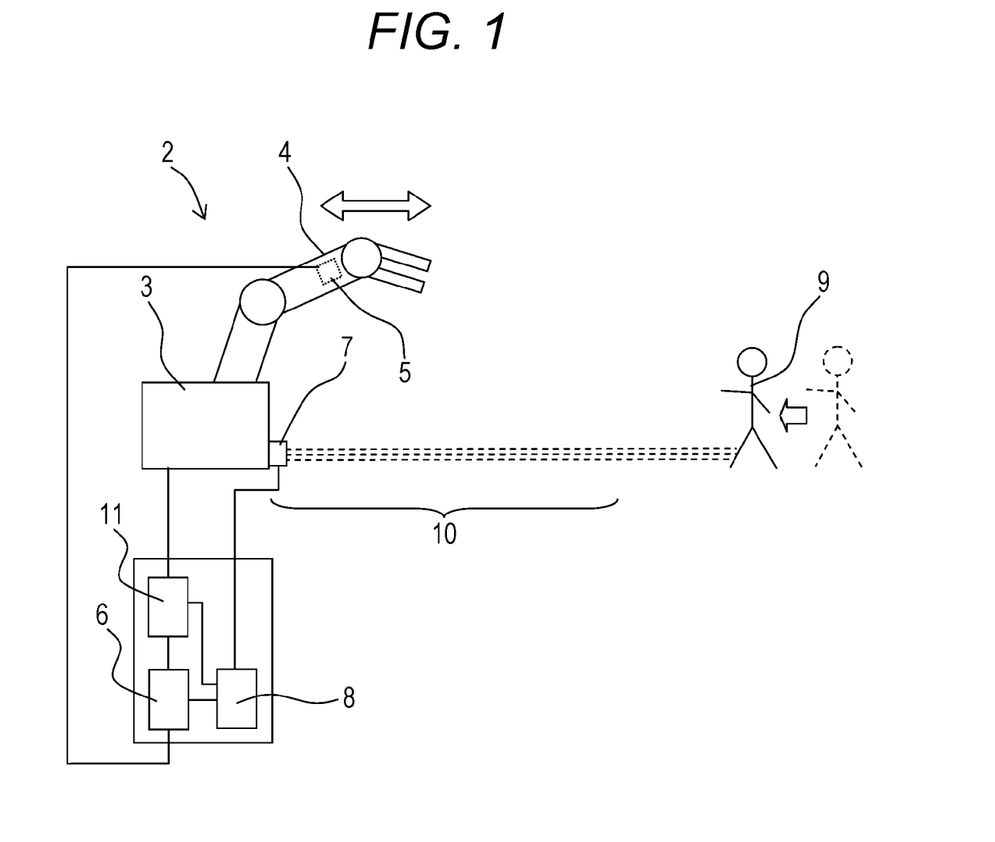
FIG. 1 is a schematic diagram illustrating the operation of a robot system according to a first embodiment.
Figure 2:
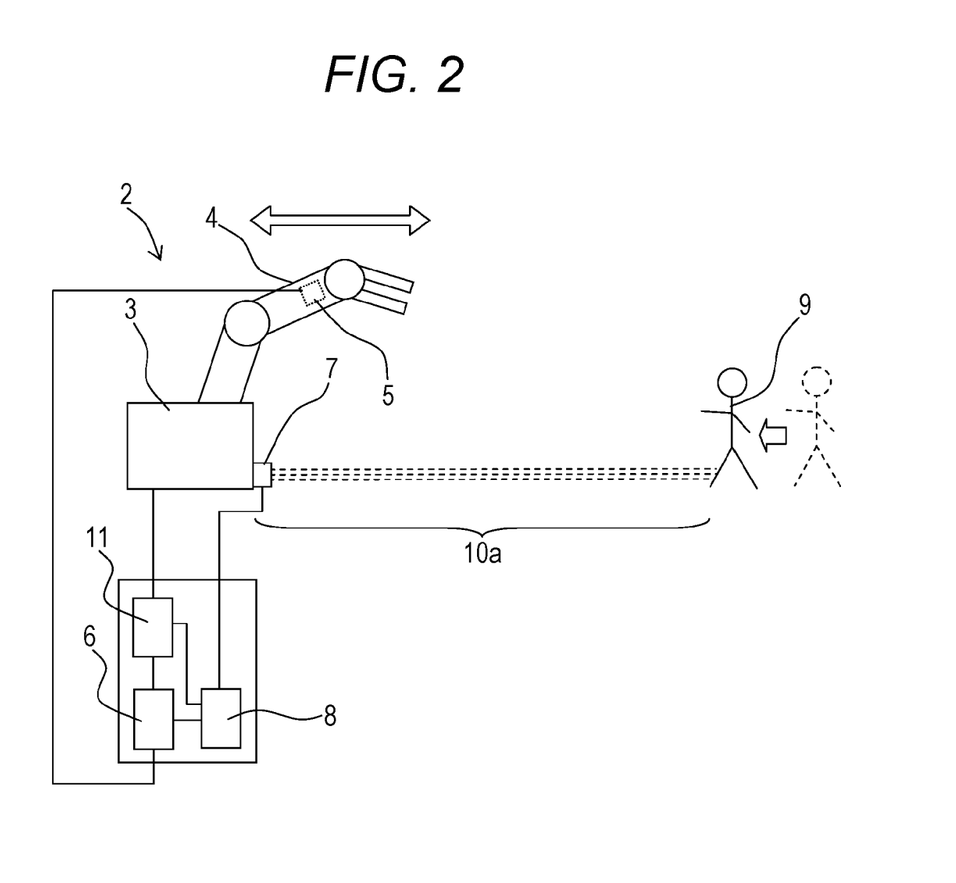
FIG. 2 is a schematic diagram illustrating an example in which the motion speed of a working arm is higher than that in the state depicted in FIG. 1.
Figure 3:
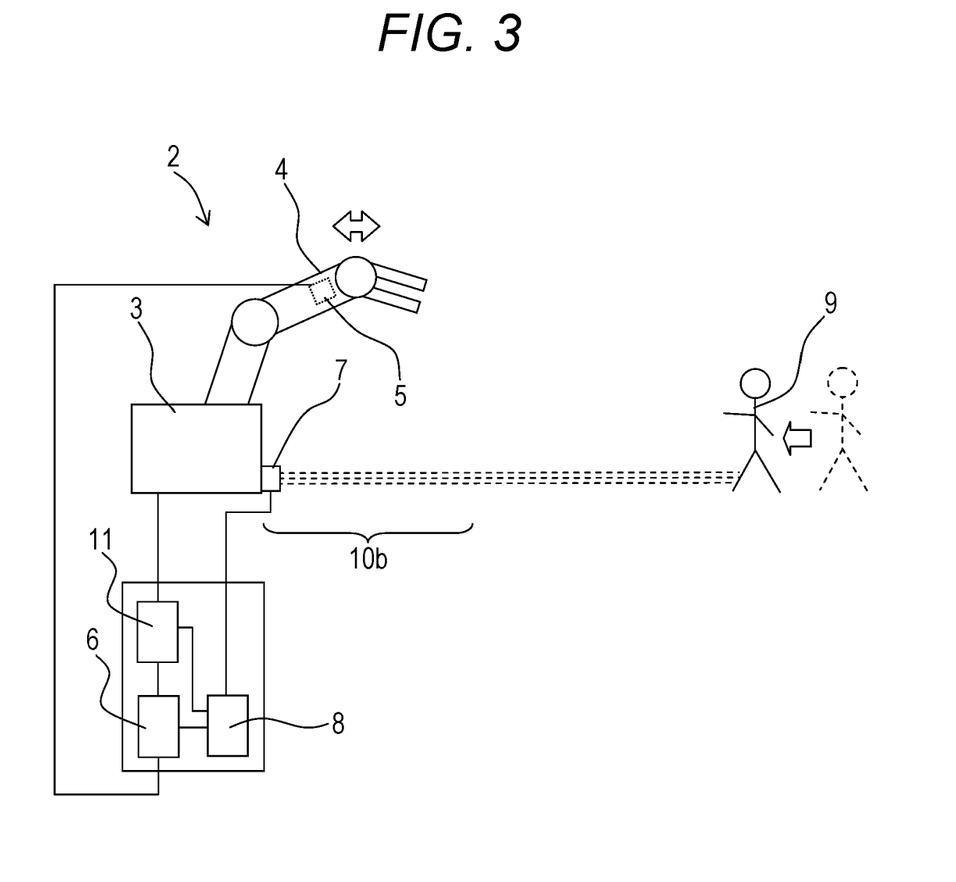
FIG. 3 is a schematic diagram illustrating an example in which the motion speed of the working arm is lower than that in the state depicted in FIG. 1.

A robot system according to a first embodiment is hereinafter described with reference to drawings. FIG. 1 is a schematic diagram illustrating the operation of the robot system according to the first embodiment. FIG. 2 is a schematic diagram illustrating an example in which the motion speed of a working arm is higher than that in the state depicted in FIG. 1. FIG. 3 is a schematic diagram illustrating an example in which the motion speed of the working arm is lower than that in the state depicted in FIG. 1. In FIG. 1, FIG. 2, and FIG. 3, the magnitude of the absolute value of the motion speed of the working arm is represented by the length of the arrow depicted above a working arm 4.

The motion speed of the working arm 4 generally refers to the motion speed of an end of the working arm.

As illustrated in FIG. 1, a robot system 2 includes a robot 3, a motion speed detection unit 5, a region setting unit 6, a moving body detection unit 7, an abnormality determination unit 8, and a motion control unit 11. The robot 3 has the working arm 4 that is operable. The term "operable" means that the operation of the working arm 4 of, for example, expansion, contraction, stretch, or rotation is possible by a mechanical element for converting energy into physical movement, such as an actuator. The robot 3 includes one or more working arms 4. The motion speed detection unit 5 detects the motion speed of the working arm 4. In other words, the motion speed detection unit 5 detects the motion speed of this working arm 4 when the working arm 4 operates, for example, to expand, contract, stretch, or rotate. The region setting unit 6 sets a region 10 with a predetermined range around the robot 3. The region 10 may be a circular region having a predetermined radius with the robot system 2 serving as a center. The moving body detection unit 7 detects the position of a moving body 9 other than the robot 3. The moving body 9 other than the robot 3 corresponds to, for example, a person, a hand lift, a conveyer truck, or a self-running robot other than the robot 3. The abnormality determination unit 8 determines the abnormality when detecting of the moving body 9 within the region 10.

The motion control unit 11 controls the motion of the robot 3 or the working arm 4. In accordance with the motion program to be described later, the motion control unit 11 outputs the motion order to the actuator of the working arm 4. On the other hand, the motion control unit 11 monitors the positional information or the like of the actuator and controls the working arm 4 so that the working arm 4 operates based on the motion order. The motion control unit 11 changes the motion speed of the working arm 4 or stops the working arm 4 on the basis of the abnormality determination made by the abnormality determination unit 8.

Further, the robot system 2 includes a storage unit (not shown) for storing the motion program or the parameters necessary for the control.

In the robot system 2, the region setting unit 6 changes the range of the region 10 in response to the motion speed of the working arm 4. Such a robot system 2 can achieve high safety and high working efficiency. In other words, as illustrated in FIG. 2, if the motion speed of the working arm 4 is high, the range of the region 10 where the abnormality determination is performed becomes wide as a region 10a illustrated in FIG. 2. Meanwhile, as illustrated in FIG. 3, if the motion speed of the working arm 4 is low, the range of the region 10 where the abnormality determination is performed becomes narrow as a region 10b illustrated in FIG. 3. Thus, the robot system 2 can variably set the region 10 where the abnormality is determined upon the entry of the moving body 9. Therefore, the moving body 9 can secure the minimum safety distance in accordance with the work of the robot 3. This reduces the space occupied by the robot 3. Further, the robot 3 operates at the maximum speed that is allowed according to the work. This can reduce the takt time. As a result, the productivity and the rate of operation of the robot 3 are improved.

The robot system 2 illustrated in FIG. 1 includes, for example, the robot 3 having the multi joint working arm 4, which is disposed on a floor, a ceiling, a wall surface, or the like. The robot 3 is not limited to the robot 3 described above as long as the robot has the operable working arm 4. For example, although not shown, the robot 3 may have a base that supports the working arm 4 and a moving mechanism that moves this base.

In the robot system 2 illustrated in FIG. 1, the motion speed detection unit 5 is disposed on the working arm 4. The motion speed detection unit 5 may be, for example, a measuring device for detecting the motion speed by measuring the acceleration of the working arm 4 during the operation and integrating the measured acceleration. Although not shown, the motion speed detection unit may be a device for detecting the motion speed of the working arm 4 from outside the robot 3.

The moving body detection unit 7 detects the position of the moving body 9 other than the robot 3 around the robot 3. If the moving body 9 as the detection target is the one moving on the floor, the moving body detection unit 7 such as a laser ranging device may be disposed at a predetermined height from the floor as illustrated in FIG. 1 to detect the position of the moving body 9 at the predetermined height. The moving body detection unit 7 is not limited to the laser ranging device. The moving body detection unit 7 may be, for example, a photographing device or a data receiving device for reading data from an IC tag provided for the moving body 9.

The region setting unit 6 may have a storage unit for storing correlation data. The correlation data are obtained by associating the motion speed of the working arm 4 and the range of the region 10 in advance. The region setting unit 6 reads out the correlation data from such a storage unit. The region setting unit 6 can set the range of the region 10 that is suitable for the motion speed detected by the motion speed detection unit 5 on the basis of the correlation data.

The abnormality determination unit 8 determines whether the state is abnormal or not based on the range of the region 10 set by the region setting unit 6 and the position of the moving body 9 detected by the moving body detection unit 7. That is, the state is determined as being abnormal when detecting of the position of the moving body 9 within the region 10. For example, the state is determined as being abnormal if an appropriate distance is not secured between the moving body 9 and the working arm 4. Upon the determination of the abnormality, the motion control unit 11 performs a predetermined process. This predetermined process may include at least one control of the stop of motion of the working arm 4, the issuing of alarm, and the reduction of motion speed of the working arm 4. If the motion of the working arm 4 stops, the contact between the moving body 9 and the working arm 4 is unlikely to happen unless the moving body 9 gets closer to interfere with the working arm 4. Thus, the safety of the moving body 9 can be secured. Upon the determination of the abnormality, the motion control unit 11 may issue an alarm. This can warn the moving body 9 or another worker around the moving body 9 that the moving body 9 is too close to the working arm 4. This can suppress the interference between the moving body 9 and the working arm 4. Even though the moving body 9 interferes with the working arm 4, the influence of the interference on the moving body 9 can be reduced by reducing the motion speed of the working arm 4. When the motion speed of the working arm 4 is reduced, the moving body 9 can be easily retracted.

Figure 4:
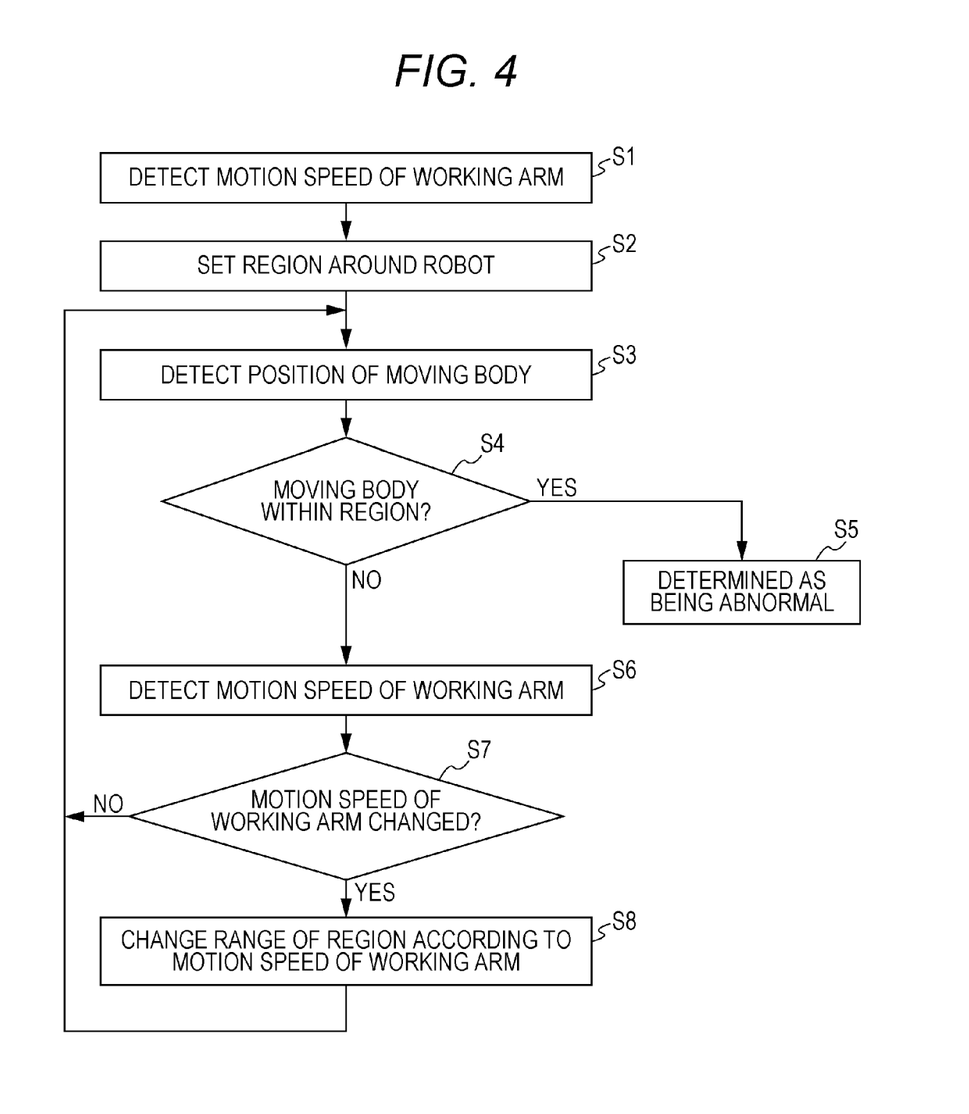
FIG. 4 is a flowchart illustrating the procedure for changing a range of a region and the procedure for abnormality determination in the robot system according to the first embodiment.

The procedures for changing the range of the region 10 and determining the abnormality according to the robot system 2 as above are illustrated in the flowchart. FIG. 4 is a flowchart illustrating the procedures for changing the range of the region 10 and determining the abnormality according to the robot system 2 of the first embodiment. In the robot system 2, first, the motion speed detection unit 5 detects the motion speed of the working arm 4 in Step S1. The detection of the motion speed is to set the region 10 initially around the robot 3. The motion speed detection unit 5 may be, for example, an acceleration sensor. The motion speed detection unit 5 for measuring the motion speed of the working arm 4 from the outside of the robot 3 may be, for example, a measurer for detecting the motion speed by measuring the Doppler shift of a microwave or laser light. The robot 3 may be configured to execute the work according to a predetermined motion program installed in advance. In this case, the motion speed detection unit 5 can detect the motion speed of the working arm 4 on the basis of the set speed described in the motion program.

There is another method of detecting the motion speed of the working arm 4 instead of using the acceleration sensor or the measurer provided outside the robot 3. For example, the motion speed of the working arm 4 may be detected using a detection value of a positional information detection unit provided for each actuator for operating the working arm 4. A specific example is given. It is assumed that the working arm 4 includes a plurality of joints, each join being driven by a servomotor having an encoder. In this case, if the shape of the arm connecting between the joints is known, the motion speed detection unit 5 can calculate the position of the end of the working arm by performing kinematics calculation with the position of each joint obtained from each encoder. The motion speed detection unit 5 can calculate the motion speed of the working arm 4 by obtaining the position of the end of the working arm 4 at predetermined time intervals and performing the time derivative.

Next, in Step S2, the region setting unit 6 sets the region 10 around the robot 3 on the basis of the detected motion speed of the working arm 4. If there is any change in the motion speed of the working arm 4, this region 10 varies depending on the motion speed of the working arm 4 as appropriate in Step S7 and Step S8 to be described later. If the motion speed of the working arm 4 is high, the range of the region 10 is set wider. Meanwhile, if the motion speed of the working arm 4 is low, the range of the region 10 is set narrower. The region setting unit 6 may include a storage unit storing the correlation data in which the motion speed of the working arm 4 and the range of the region 10 are associated with each other. In this case, the region setting unit 6 may set the range of the region 10 as below. First, the region setting unit 6 reads out the correlation data out of the storage unit. The region setting unit 6 sets the range of the region 10 so as to suite the motion speed detected by the motion speed detection unit 5.

Next, in Step S3, the moving body detection unit 7 detects the position of the moving body 9. The moving body detection unit 7 may be, for example, a laser ranging device, a photographing device, or a data receiving device for reading data from an IC tag provided for the moving body 9.

Next, in Step S4, the abnormality determination unit 8 determines whether the position of the moving body 9 is within the region 10 or not. If the position of the moving body 9 is within the region 10, the process advances to Step S5 where the state is determined as being abnormal. In other words, if the position of the moving body 9 is within the region 10, the state is determined as being abnormal because the moving body 9 does not secure enough distance relative to the motion speed of the working arm 4. If the state is determined as being abnormal, an appropriate instruction may be given to at least one of the robot 3 and the moving body 9. This secures the safety of the robot 3 and the moving body 9. If the position of the moving body 9 is not within the region 10, the state is not determined as being abnormal. On this point, the motion of the working arm 4 of the robot 3 and the work of the moving body 9 are not restricted.

If the position of the moving body 9 is not within the region 10 as described above, the process advances to Step S6 where the motion speed of the working arm 4 is detected again. In other words, the motion speed of the working arm 4 is not always constant, and may vary during the operation of the robot 3. Therefore, if the state is not determined as being abnormal in Step S4, the motion speed detection unit 5 detects the motion speed of the working arm 4 again. Next, in Step S7, the region setting unit 6 checks if there is a change in the motion speed of the working arm 4. If there is a change in the motion speed of the working arm 4, the process advances to Step S8 where the region setting unit 6 changes the range of the region 10 in accordance with the motion speed of the working arm 4. The motion speed detection unit 5 may detect the motion speed of the working arm 4 continuously. In this case, the region setting unit 6 may change the range of the region 10 in accordance with the motion speed of the working arm 4 in real time. That is, for the convenience of the description, the motion speed of the working arm 4 is detected again in Step S6 after the detection of the position of the moving body 9 in Step S3 and the determination on whether the position of the moving body 9 is within the region 10 in Step S4. However, the motion speed of the working arm 4 may be detected continuously in parallel to the detection of the position of the moving body 9 in Step S3 and the determination on whether the position of the moving body 9 is within the region 10 in Step S4. Then, the range of the region 10 may be changed as appropriate in accordance with the change in the motion speed of the working arm 4.

If there is no change in the motion speed of the working arm 4 in Step S7, the process returns to Step S3 where the moving body detection unit 7 detects the position of the moving body 9 again. In other words, even though the state is not determined as being abnormal in Step S4, the further movement of the moving body 9 may change the position. Thus, even though the state is not determined as being abnormal in Step S7, the moving body detection unit 7 detects the position of the moving body 9 again. Moreover, also in the case where the range of the region 10 is changed in Step S8, the process returns to Step S3 where the moving body detection unit 7 detects the position of the moving body 9 again. Then, based on the result of detecting the position of the moving body 9, the abnormality determination unit 8 determines again whether the position of the moving body 9 is within the region 10 or not in Step S4. Further, in a manner similar to the detection of the motion speed of the working arm 4, the moving body detection unit 7 may continuously detect the position of the moving body 9. In other words, the abnormality determination unit 8 may determine whether the real-time position of the moving body 9 is within the region 10 changed according to the real-time motion speed of the working arm 4, by knowing the real-time position of the moving body 9.

For example, in a known robot system, the operation region for people has been uniformly set according to the positional relation relative to the robot. Therefore, the influence (risk) depending on the motion speed of the working arm 4 has not been taken into consideration in the known robot system. In the robot system 2 of this embodiment described so far, the range of the region 10 can be changed according to the motion speed of the working arm 4. Therefore, even though the moving body 9 is always present at the same position, for example, the state may be determined as being abnormal if the enough safety distance is no longer secured relative to the motion speed of the working arm 4. Therefore, the moving body 9 can secure the minimum safety distance in accordance with the work of the robot 3. This can reduce the space occupied by the robot 3. Moreover, when the robot 3 is operated at the maximum speed allowed according to the work of the robot 3, the takt time can be shortened. This can improve the productivity and the rate of operation of the robot 3.

[First Modified Example]

Figure 5:
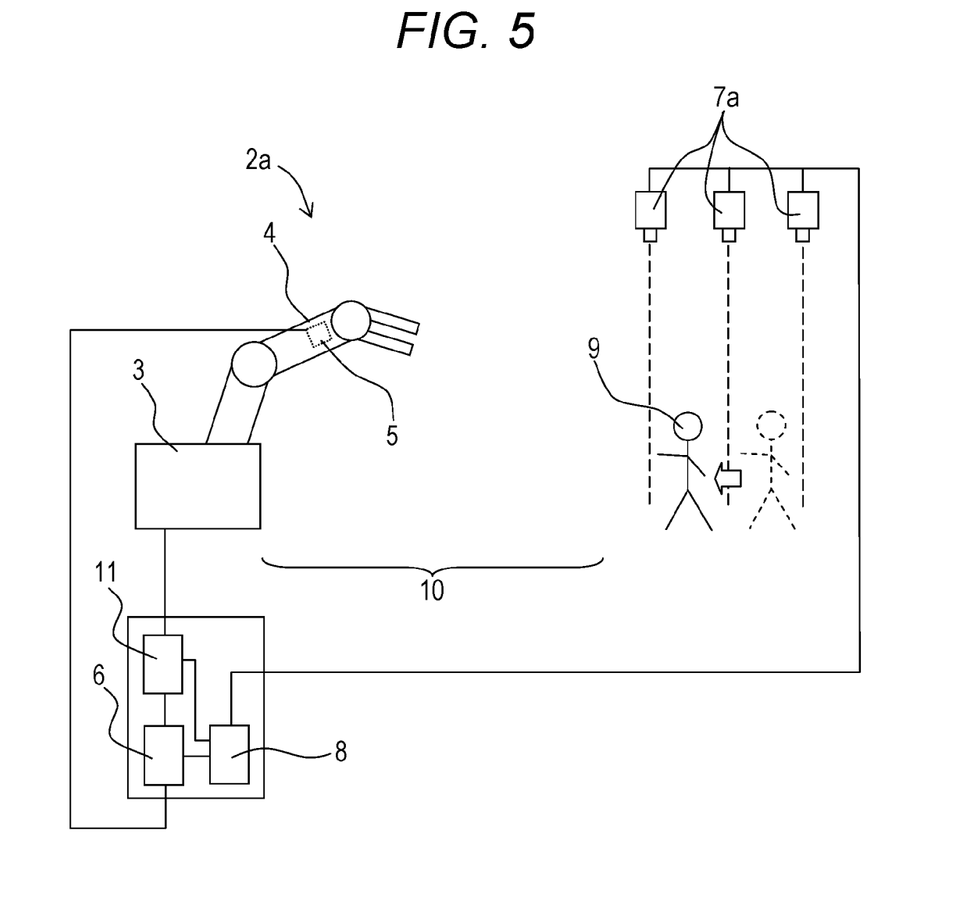
FIG. 5 is a schematic diagram illustrating the operation of the robot system according to a first modified example.

FIG. 5 is a schematic diagram illustrating the operation of a robot system according to a first modified example. As illustrated in FIG. 5, a robot system 2a includes the robot 3, the motion speed detection unit 5, the region setting unit 6, a moving body detection unit 7a, the abnormality determination unit 8, and the motion control unit 11. The moving body detection unit 7a of the robot system 2a includes a plurality of moving body sensing sensors disposed on a ceiling around the robot 3. These moving body sensing sensors are disposed at predetermined intervals at different positions whose distance from the robot 3 is different. In the robot system 2a, the position of the moving body 9 other than the robot 3 can be detected using such plural moving body sensing sensors. In the example illustrated in FIG. 5, the three moving body sensing sensors are disposed at almost equal intervals on the ceiling around the robot 3. The moving body sensing sensor may be, for example, a known sensor using an infrared ray, an ultrasonic wave, visible light, or the like. Since the other configurations of the robot system 2a of the first modified example are similar to those of the first embodiment, the description is omitted.

[Second Modified Example]

Figure 6:
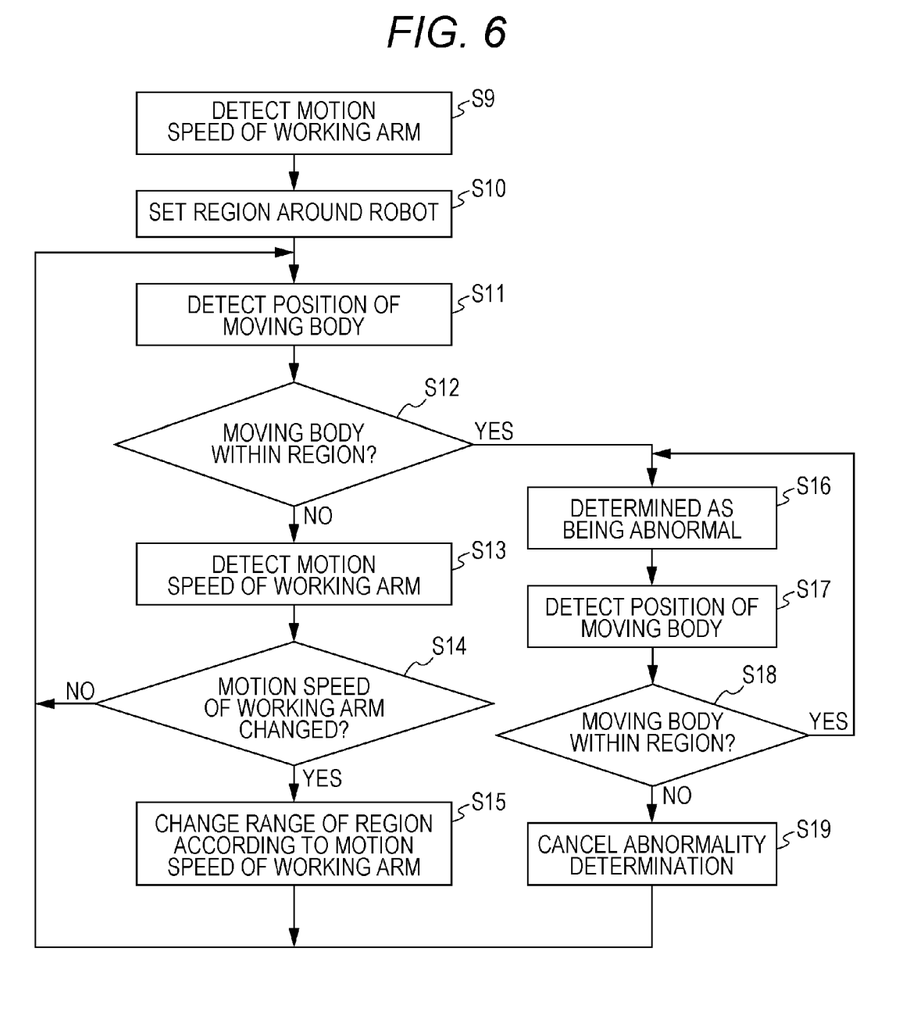
FIG. 6 is a flowchart illustrating the procedure for changing a range of a region and the procedure for abnormality determination in a robot system according to a second modified example.

FIG. 6 is a flowchart illustrating the procedure for changing the range of the region 10 and the procedure for the abnormality determination of the robot system 2 or 2a according to a second modified example. As illustrated in FIG. 6, in the procedure according to the second modified example, the motion speed detection unit 5 first detects the motion speed of the working arm 4 in Step S9. Next, in Step S10, the region setting unit 6 sets the region 10 around the robot 3 on the basis of the detected motion speed of the working arm 4. Then, in Step S11, the moving body detection unit 7 or 7a detects the position of the moving body 9. Next, in Step S12, the abnormality determination unit 8 determines whether the position of the moving body 9 is within the region 10 or not. If the position of the moving body 9 is within the region 10, the process advances to Step S16 where the state is determined as being abnormal. In the procedure according to the second modified example, after the abnormality determination in Step S16, the moving body detection unit 7 or 7a detects the position of the moving body 9 again in Step S17. Then, in Step S18, the abnormality determination unit 8 determines whether the position of the moving body 9 is within the region 10 or not. Then, if the position of the moving body 9 is detected within the region 10, the process returns to Step S16 and the abnormality determination is maintained. If the position of the moving body 9 is not within the region 10, the process advances to Step S19 where the abnormality determination is cancelled. Thus, in the procedure illustrated in FIG. 6, even after the abnormality determination in Step S16, the position of the moving body 9 is detected. Then, if the moving body 9 is not confirmed within the region 10 due to, for example, the retraction of the moving body 9, the safety of the moving body 9 is regarded as being assured and the abnormality determination is cancelled. This improves the productivity and the rate of operation of the robot 3. The expression "the abnormality determination is cancelled" refers to that "the working arm 4 operates at higher speed than the motion speed after the abnormality determination". For cancelling the abnormality determination, the motion control unit 11 may reset the working arm so that the working arm 4 operates at the speed set by the motion program. If the position of the moving body 9 is determined as not being within the region 10 in Step S12, the steps after this advance according to the procedure similar to that of the robot system 2 of the first embodiment. In other words, in Step S13, the motion speed of the working arm 4 is detected again. Then, in Step S14, whether there is a change in motion speed of the working arm 4 is determined. If there is a change in motion speed of the working arm 4, the process advances to Step S15 where the range of the region 10 is changed according to the motion speed of the working arm 4. Then, the process returns to Step S11 and the position of the moving body 9 is detected again. If there is no change in motion speed of the working arm 4 in Step S14, the process returns to Step S11 and the position of the moving body 9 is detected again.

[Third Modified Example]

Figure 7:
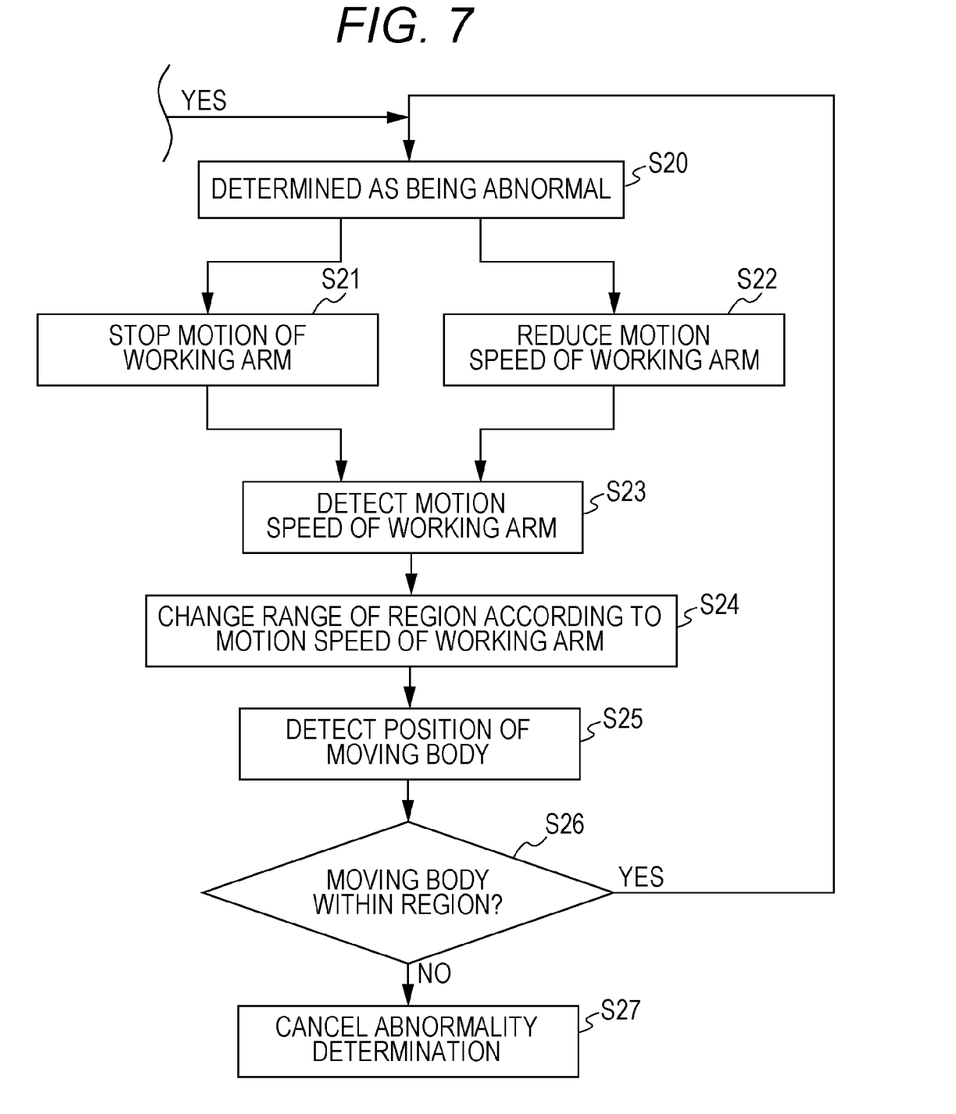
FIG. 7 is a flowchart illustrating the procedure for changing a range of a region and the procedure for abnormality determination in a robot system according to a third modified example.

FIG. 7 is a flowchart illustrating the procedure for changing the range of the region 10 and the procedure for the abnormality determination in the robot system 2 or 2a according to a third modified example. FIG. 7 is a flowchart of the process after the determination on whether the position of the moving body 9 is within the region 10 or not, and after the abnormality determination step (Step S20). The procedure before Step S20 is similar to that illustrated in FIG. 4; thus, the procedure before Step S20 is not illustrated in FIG. 7. As illustrated in FIG. 7, in the procedure according to the third modified example, at least one control of the stop of motion of the working arm 4 and the reduction of motion speed of the working arm 4 is executed upon the abnormality determination in Step S20. In other words, after the abnormality determination is made in Step S20, the control for stopping the motion of the working arm 4 in Step S21 or the control for reducing the motion speed of the working arm 4 in Step S22 is executed. In the robot system according to the third modified example, the motion speed of the working arm 4 is detected in Step S23 again after Step S21 and Step S22. Next, in Step S24, the range of the region 10 is changed according to the detected motion speed of the working arm 4. After the range of the region 10 is changed, the position of the moving body 9 is detected again in Step S25. Then, in Step S26, whether the position of the moving body 9 is within the region 10 or not is determined. For example, the range of the region 10 is changed by the control for reducing the motion speed of the working arm 4. The range of the region 10 after the change is narrower than the range at the abnormality determination. When detecting that the position of the moving body 9 is not within the range of the region 10 after the change, the process advances to Step S27 where the abnormality determination is cancelled. When detecting that the position of the moving body 9 is within the range of the region 10 after the change, the process returns to Step S20 and the abnormality determination is maintained. This improves the productivity and the rate of operation of the robot 3. In particular, in the procedure according to the third modified example, it is possible to suppress that the working efficiency of the robot 3 is deteriorated because of taking the safety countermeasure excessively.

[Fourth Modified Example]

Figure 8:
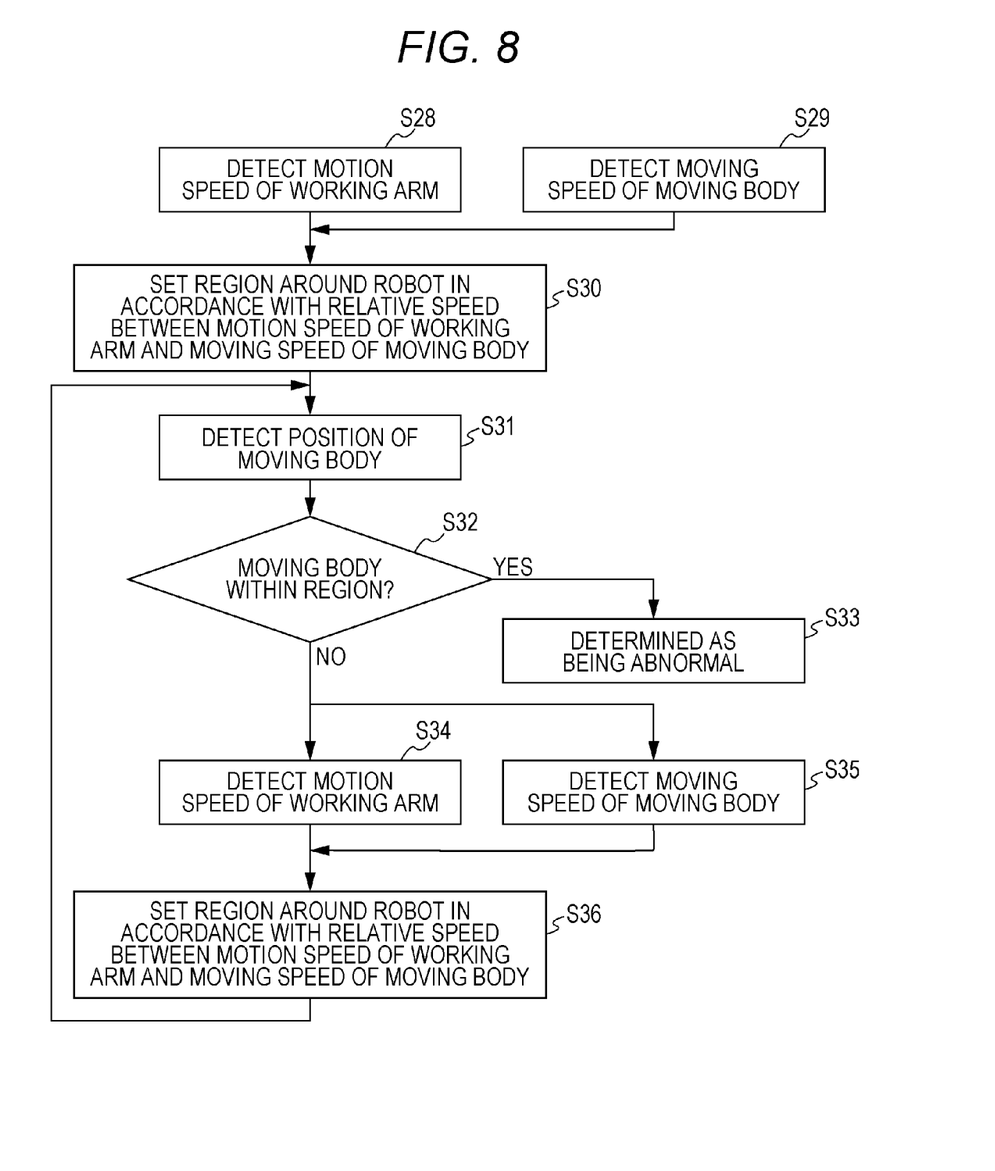
FIG. 8 is a flowchart illustrating the procedure for changing a range of a region and the procedure for abnormality determination in a robot system according to a fourth modified example.

FIG. 8 is a flowchart illustrating the procedure for changing the range of the region 10 and the procedure for the abnormality determination in the robot system 2 or 2*a* according to a fourth modified example. In the procedure according to the fourth modified example, the moving body detection unit 7 or 7*a* detects the position and the moving speed of the moving body 9. In other words, first, the motion speed detection unit 5 detects the motion speed of the working arm 4 in Step S28. Moreover, in Step S29, the moving body detection unit 7 or 7*a* detects the motion speed of the moving body 9. Then, in Step S30, the region setting unit 6 sets the range of the region 10 in accordance with the relative speed between the motion speed of the working arm 4 and the moving speed of the moving body 9. Next, in Step S31, the moving body detection unit 7 or 7*a* detects the position of the moving body 9. Then, in Step S32, the abnormality determination unit 8 determines whether the position of the moving body 9 is within the region 10 or not. When detecting that the position of the moving body is within the region 10, the process advances to Step S33 and the state is determined as being abnormal. The determination on whether the position of the moving body is within the region 10 or not and the abnormality determination are performed based on a procedure similar to that illustrated in FIG. 4. If the position of the moving body 9 is not within the region 10, the process advances to Step S34 and S35. In Step S34, the motion speed detection unit 5 detects the motion speed of the working arm 4 again. Moreover, in Step S35, the moving body detection unit 7 or 7*a* detects the moving speed of the moving body 9 again. Next, in Step S36, the region setting unit 6 sets the range of the region 10 again in accordance with the relative speed between the motion speed of the working arm 4 and the moving speed of the moving body 9. In other words, in this Step S36, the range of the region 10 is changed. After that, the process returns to Step S31 where the moving body detection unit 7 or 7*a* detects the position of the moving body 9 again. Subsequently, as for the range of the region 10 after the change, the abnormality determination unit 8 determines whether the position of the moving body 9 is within the region 10 or not in Step S32. In this manner, according to the procedure in the fourth modified example, the range of the region 10 is set in accordance with the relative speed between the motion speed of the working arm 4 and the moving speed of the moving body 9. Thus, the higher safety can be realized. The moving body detection unit 7 or 7*a* is not particularly limited as long as the position and the moving speed of the moving body 9 can be detected. The change in position of the moving body 9 over time corresponds to the speed. Therefore, as long as the position of the moving body 9 can be detected continuously, the moving body detection unit 7 or 7*a* can detect the moving speed of the moving body.

[Another Modified Example]

The robot 3 is capable of executing a plurality of works by having a motion program installed therein in advance. The motion program may contain the information for defining the motion speed of the working arm 4. When the motion program has the information for defining the motion speed of the working arm 4, the motion of the working arm 4 with high flexibility can be realized. In other words, the motion speed of the working arm 4 can be defined in accordance with the position of the moving body 9. Thus, higher safety and working efficiency can be realized.

Further, the motion program may contain the information for defining the motion speed of the working arm 4. The abnormality determination unit 8 may perform different abnormality determination according to the work of the robot in execution if the position of the moving body 9 is detected within the region 10. Depending on the kind of the abnormality determination, the motion control unit 11 may change the process after the abnormality determination. For example, if the work of the robot 3 in execution is highly safe to the moving body 9, the motion control unit 11 may continue a part of the motion of the working arm 4 during the abnormality determination. Meanwhile, if the work of the robot 3 in execution is not so safe to the moving body 9, the motion control unit 11 may completely stop the motion of the working arm 4 during the abnormality determination. A part of the motion of the working arm 4 that is continued may be, for example, a process including the issuing of alarm, or the control for reducing the motion speed of the working arm 4. In the process such as the emergency stop of completely stopping the motion of the working arm 4, it may take time to restore the state of the working arm 4 and restart the motion. Therefore, the different process capable of securing the enough safety may be performed as appropriate after the abnormality determination in accordance with the work in execution. This can realize higher safety and working efficiency.

The motion speed detection unit 5 may be configured to detect at least one component of an X-direction component, a Y-direction component, and a Z-direction component on an XYZ coordinate system of the motion speed of the working arm 4. The region setting unit 6 may be configured to set the range of the region 10 in accordance with at least one component among the X-direction component, the Y-direction component, and the Z-direction component of the motion speed detected by the motion speed detection unit 5. Even though the absolute value of the motion speed is the same, the influence from the motion of the working arm 4 may be different depending on the direction of the motion. For example, in the case where the working arm 4 operates in a direction away from the moving body 9, the influence on the moving body 9 from the working arm 4 is smaller than that in the case where the working arm 4 operates in a direction toward the moving body 9. As described above, the motion speed of the working arm 4 may be decomposed into the XYZ coordinate system to set the range of the region 10. Thus, the appropriate safety countermeasure can be built according to the motion content of the working arm 4. Needless to say, the region setting unit 6 may set the range of the region 10 in accordance with the absolute value of the motion speed of the working arm 4. The setting of the range of the region 10 can be simplified by setting the range of the region 10 in accordance with the absolute value of the motion speed of the working arm 4.

The region setting unit 6 may set plural different regions 10 around the robot 3. The abnormality determination unit 8 may perform different abnormality determination for each region 10. For example, the abnormality determination unit 8 may perform the different abnormality determination in the region 10 where the entry or exit of the moving body 9 occurs frequently and the region 10 where the entry or exit of the moving body 9 occurs infrequently. The region setting unit 6 may set the plural regions 10 where the distance from the region boundary to the robot 3 is different (for example, plural nested regions). Then, the abnormality determination unit 8 may perform the abnormality determination in which the motion of the working arm 4 is more restricted as the distance to the robot 3 becomes shorter. Thus, the safety countermeasure according to the circumstances around the robot 3 can be built individually.

[Second Embodiment]

A method for controlling the robot system according to a second embodiment is hereinafter described. The method for controlling the robot system according to the second embodiment is a method for controlling the robot system 2 according to the first embodiment illustrated in FIG. 1. The control method according to the second embodiment includes a motion speed detecting step, a region setting step, a moving body detecting step, and an abnormality determining step. In the motion speed detecting step, as illustrated in FIG. 1, the motion speed detection unit 5 detects the motion speed of the working arm 4 of the robot 3 having the operable working arm 4. In the region setting step, the region setting unit 6 sets the region 10 with a predetermined range around the robot 3. In the moving body detecting step, the moving body detection unit 7 detects the position of the moving body 9 other than the robot 3. In the abnormality determining step, the abnormality determination unit 8 determines the abnormality when detecting of the position of the moving body 9 within the region 10. In the region setting step, the region setting unit 6 changes the range of the region 10 according to the motion speed of the working arm 4.

The procedure for the control in the method for controlling the robot system according to the second embodiment is described in the order of steps with reference to the flowchart illustrated in FIG. 4. First, in Step S1, the motion speed detection unit 5 detects the motion speed of the working arm 4. Next, in Step S2, the region setting unit 6 sets the region 10 around the robot 3. Then, in Step S3, the moving body detection unit 7 detects the position of the moving body 9 other than the robot 3. In Step S4, subsequently, the abnormality determination unit 8 determines whether the position of the moving body 9 is within the region 10. If the position of the moving body 9 is within the region 10, the process advances to Step S5 where the state is determined as being abnormal. If the position of the moving body 9 is not within the region 10, the process advances to Step S6 where the motion speed detection unit 5 detects the motion speed of the working arm 4 again. Next, in Step S7, the motion speed detection unit 5 determines whether there is a change in the motion speed of the working arm 4. If there is a change in the motion speed of the working arm 4, the process advances to Step S8 where the region setting unit 6 changes the range of the region 10 according to the motion speed of the working arm 4. If there is no change in the motion speed of the working arm 4, the process returns to Step S3 and the moving body detection unit 7 detects the position of the moving body 9 again. In Step S8, even when the range of the region 10 is changed, the process returns to Step S3 and the moving body detection unit 7 detects the position of the moving body 9 again. However, if the process includes Step S8, the abnormality determination unit 8 determines whether the position of the moving body 9 is within the region 10 on the basis of the range of the region 10, which has been changed in Step S8, in Step S4 conducted subsequent to Step S3. According to the method for controlling the robot system as above, high safety and working efficiency can be realized. Moreover, the moving body 9 can secure the minimum safety distance in accordance with the work of the robot 3. This can reduce the space occupied by the robot 3. Moreover, by the operation at the maximum speed allowed according to the work of the robot 3, the takt time can be shortened. This improves the productivity and the rate of operation of the robot 3.

The method for controlling the robot system may be a method for controlling the robot system according to any of the first to fourth modified examples, or the robot system according to the other modified example. In accordance with the structure of the robot system of each modified example described so far, the motion speed detecting step, the region setting step, the moving body detecting step, and the abnormality determining step may be modified as appropriate.

The embodiments have been described so far. However, the present disclosure is not limited thereto. Various modifications and changes can be made within the content thereof.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A robot system comprising: a robot including an operable working arm;
   a motion speed detection unit configured to detect a motion speed of the working arm; a region setting unit configured to simultaneously set a plurality of regions around the robot;
   a moving body detection unit configured to detect a position of the moving body other than the robot and a moving speed of the moving body; and
   an abnormality determination unit configured to determine abnormality when detecting the position of the moving body within the regions and perform different abnormality determinations for each of the regions, the abnormality detection unit being configured to perform the different abnormality determinations in accordance with a work of the robot in execution when detecting the position of the moving body within the regions, wherein the region setting unit is configured to change a range of the regions based on the motion speed of the working arm and based on the moving speed of the moving body, wherein the robot changes a motion of the robot based on a level of safety of the work of the robot in execution with respect to the moving body when detecting the position of the moving body within the region, and wherein a motion program for the robot contains information that defines the motion speed of the working arm.

2. The robot system according to claim 1, wherein the robot has a base that supports the working arm and a moving mechanism configured to move the base.

3. The robot system according to claim 1, wherein the region setting unit is configured to set the range of the regions in accordance with a relative speed between the motion speed of the working arm and the moving speed of the moving body.

4. The robot system according to claim 1, wherein a process of the abnormality determination by the abnormality determination unit includes at least one control of stop of motion of the robot, issuing of alarm, and reduction of the motion speed of the working arm.

5. The robot system according to claim 1, wherein:
the robot can execute a plurality of works by having the motion program installed therein.

6. The robot system according to claim 1, wherein:
the motion speed detection unit is configured to detect at least one component of an X-direction component, a Y-direction component, and a Z-direction component on an XYZ coordinate system of the motion speed of the working arm; and
the region setting unit is configured to set the range of the regions in accordance with at least one component among the X-direction component, the Y-direction component, and the Z-direction component of the motion speed detected by the motion speed detection unit.

7. The robot system according to claim 1, wherein the moving body detection unit is a laser ranging device, a photographing device, or a data receiving device configured to read data from an IC tag provided for the moving body.

8. The robot system according to claim 1, wherein the abnormality determination unit is configured to cancel the abnormality determination when detecting that the position of the moving body is not within the regions after the abnormality determination.

9. The robot system according to claim 1,
wherein the robot stops the motion of the operable working arm of the robot, when detecting the position of the moving body within the regions and when the level is a first degree, and
wherein the robot reduces the motion speed of the operable working arm of the robot, when detecting the position of the moving body within the regions and when the level is a second degree that is safer than the first degree.

10. The robot system according to claim 1, wherein the moving body detection unit is configured to detect the position of the moving body other than the robot or another robot.

11. The robot system according to claim 1, wherein the motion speed detection unit comprises a measuring device disposed on the working arm to measure acceleration of the working arm.

12. A method for controlling a robot system, comprising:
detecting a motion speed of an operable working arm of a robot with a motion speed detection unit;
simultaneously setting a plurality of regions around the robot with a region setting unit; detecting a position and a moving speed of a moving body other than the robot with a moving body detection unit; and
determining abnormality when detecting the position of the moving body within the regions with an abnormality determination unit and performing different abnormality determinations for each of the regions, performing the different abnormality determinations in accordance with a work of the robot in execution when detecting the position of the moving body within the regions,
wherein the setting of the regions includes changing a range of the regions according to the motion speed of the working arm and according to the moving speed of the moving body,
wherein a motion program contains information that defines the motion speed of the working arm, and
the method further comprising:
changing a motion of the robot based on a level of safety of the work of the robot in execution with respect to the moving body when the abnormality is determined.

13. The method for controlling a robot system according to claim 12, wherein the changing the motion of the robot comprises,
a stopping the motion of the operable working arm of the robot, when the abnormality is determined and when the level is a first degree, and
a reducing the motion speed of the operable working arm of the robot, when the abnormality is determined and when the level is a second degree that is safer than the first degree.

14. The method for controlling a robot system according to claim 12, wherein the step of detecting a position of the moving body comprises detecting the position of the moving body, the moving body being a moving body other than the robot or another robot.

15. The method for controlling a robot system according to claim 12, wherein the motion speed detection unit comprises a measuring device disposed on the working arm to measure acceleration of the working arm.

* * * * *